United States Patent
Wheeler et al.

(10) Patent No.: US 10,877,626 B2
(45) Date of Patent: Dec. 29, 2020

(54) METHODS, SYSTEMS, AND MEDIA FOR PRESENTING RELATED CONTENT IN A USER INTERFACE NAVIGATED USING DIRECTIONAL CONTROLS

(71) Applicant: Google LLC, Mountain View, CA (US)

(72) Inventors: Aaron Joseph Wheeler, San Francisco, CA (US); Chris Lauritzen, San Francisco, CA (US)

(73) Assignee: Google LLC, Mountain View, CA (US)

(*) Notice: Subject to any disclaimer, the term of this patent is extended or adjusted under 35 U.S.C. 154(b) by 205 days.

(21) Appl. No.: 15/707,070

(22) Filed: Sep. 18, 2017

(65) Prior Publication Data

US 2018/0011614 A1 Jan. 11, 2018

Related U.S. Application Data

(63) Continuation of application No. 14/263,178, filed on Apr. 28, 2014, now Pat. No. 9,766,781.

(51) Int. Cl.
| | | |
|---|---|---|
| *G06F 3/048* | (2013.01) | |
| *G06F 3/0482* | (2013.01) | |
| *H04N 21/431* | (2011.01) | |
| *H04N 21/4722* | (2011.01) | |
| *H04N 21/482* | (2011.01) | |
| *G11B 27/34* | (2006.01) | |

(52) U.S. Cl.
CPC ............ *G06F 3/0482* (2013.01); *G11B 27/34* (2013.01); *H04N 21/4312* (2013.01); *H04N 21/4316* (2013.01); *H04N 21/4722* (2013.01); *H04N 21/482* (2013.01)

(58) Field of Classification Search
CPC ..... G06F 3/048; G06F 3/0482; H04N 21/482; H04N 21/4312; H04N 21/4316; H04N 21/4722; G11B 27/34
See application file for complete search history.

(56) References Cited

U.S. PATENT DOCUMENTS

| | | | |
|---|---|---|---|
| 2011/0122078 A1* | 5/2011 | Kasahara | G06F 3/0488 345/173 |
| 2012/0079429 A1 | 3/2012 | Stathacopoulos et al. | |
| 2012/0139945 A1 | 6/2012 | Choi | |
| 2012/0174039 A1 | 7/2012 | Rhoads et al. | |
| 2015/0248204 A1* | 9/2015 | Morita | H04N 5/445 715/802 |

OTHER PUBLICATIONS

Office Action dated Feb. 9, 2016 in U.S. Appl. No. 14/263,178.
Office Action dated Jul. 28, 2016 in U.S. Appl. No. 14/263,178.

* cited by examiner

*Primary Examiner* — Xuyang Xia
(74) *Attorney, Agent, or Firm* — Byrne Poh LLP (57) ABSTRACT

Methods, systems, and media for navigating a user interface are provided. In some embodiments, a method for navigating a user interface is provided, the method comprising: causing a user interface to be presented including a plurality of media identifier elements corresponding to media assets; causing the plurality of media identifier elements to be arranged along a first direction of the user interface; selecting a first media asset associated with a first media identifier element for presentation; identifying related media assets in response to selection of the first media asset; causing the first media asset to be presented in a first portion of the user interface; and causing related media identifier elements to be presented in a second portion of the user interface aligned with the first portion along the first direction.

18 Claims, 9 Drawing Sheets

METHODS, SYSTEMS, AND MEDIA FOR PRESENTING RELATED CONTENT IN A USER INTERFACE NAVIGATED USING DIRECTIONAL CONTROLS

CROSS-REFERENCE TO RELATED APPLICATIONS

This application is a continuation of U.S. patent application Ser. No. 14/263,178, filed Apr. 28, 2014, which is hereby incorporated by reference herein in its entirety.

TECHNICAL FIELD

The disclosed subject matter relates to methods, systems, and media for presenting related content in a user interface navigated using directional controls.

BACKGROUND

In many user interfaces that are navigated using a directional input device, such as a remote control, browsing for content and viewing content are often separated and cannot be performed concurrently. This frustrates many users that might prefer to view a current media asset while browsing through other media assets, rather than being forced to browse while viewing nothing.

Accordingly, it is desirable to provide new methods, systems, and media for presenting related content in a user interface navigated using directional controls.

SUMMARY

In accordance with various embodiments of the disclosed subject matter, methods, systems, and media for presenting related content in a user interface navigated using directional controls are provided.

In accordance with some embodiments of the disclosed subject matter, a method for media guidance is provided, the method comprising: causing, using a hardware processor, a user interface to be presented that includes a plurality of media identifier elements each corresponding to a media asset of a plurality of media assets; causing the plurality of media identifier elements to be arranged along a first direction from a first position of the user interface to a second position of the user interface; selecting a first media asset for presentation, wherein the first media asset is associated with a first media identifier element of the plurality of media identifier elements; identifying a plurality of related media assets in response to selection of the first media asset for presentation, wherein each of the plurality of related media assets is related to the first media asset; causing the first media asset to be presented in a first portion of the user interface in response to selection of the first media asset for presentation; and causing one or more related media identifier elements to be presented in a second portion of the user interface aligned with the first portion along the first direction, wherein each of the related media identifier elements corresponds to at least one of the related media assets.

In accordance with some embodiments, a system for media guidance is provided, the system comprising: a hardware processor that is programmed to: cause a user interface to be presented that includes a plurality of media identifier elements each corresponding to a media asset of a plurality of media assets; cause the plurality of media identifier elements to be arranged along a first direction from a first position of the user interface to a second position of the user interface; select a first media asset for presentation, wherein the first media asset is associated with a first media identifier element of the plurality of media identifier elements; identify a plurality of related media assets in response to selection of the first media asset for presentation, wherein each of the plurality of related media assets is related to the first media asset; cause the first media asset to be presented in a first portion of the user interface in response to selection of the first media asset for presentation; and cause one or more related media identifier elements to be presented in a second portion of the user interface aligned with the first portion along the first direction, wherein each of the related media identifier elements corresponds to at least one of the related media assets.

In accordance with some embodiments, a non-transitory computer-readable medium containing computer executable instructions that, when executed by a processor, cause the processor to perform a method for media guidance is provided, the method comprising: causing a user interface to be presented that includes a plurality of media identifier elements each corresponding to a media asset of a plurality of media assets; causing the plurality of media identifier elements to be arranged along a first direction from a first position of the user interface to a second position of the user interface; selecting a first media asset for presentation, wherein the first media asset is associated with a first media identifier element of the plurality of media identifier elements; identifying a plurality of related media assets in response to selection of the first media asset for presentation, wherein each of the plurality of related media assets is related to the first media asset; causing the first media asset to be presented in a first portion of the user interface in response to selection of the first media asset for presentation; and causing one or more related media identifier elements to be presented in a second portion of the user interface aligned with the first portion along the first direction, wherein each of the related media identifier elements corresponds to at least one of the related media assets.

In accordance with some embodiments, a system for media guidance is provided, the system comprising: means for causing a user interface to be presented that includes a plurality of media identifier elements each corresponding to a media asset of a plurality of media assets; means for causing the plurality of media identifier elements to be arranged along a first direction from a first position of the user interface to a second position of the user interface; means for selecting a first media asset for presentation, wherein the first media asset is associated with a first media identifier element of the plurality of media identifier elements; means for identifying a plurality of related media assets in response to selection of the first media asset for presentation, wherein each of the plurality of related media assets is related to the first media asset; means for causing the first media asset to be presented in a first portion of the user interface in response to selection of the first media asset for presentation; and means for causing one or more related media identifier elements to be presented in a second portion of the user interface aligned with the first portion along the first direction, wherein each of the related media identifier elements corresponds to at least one of the related media assets.

In some embodiments, the system further comprises: means for causing the first media identifier element to be highlighted from among the plurality of media identifier elements, wherein the first media identifier element is associated with the first media asset; means for receiving an instruction from a user input device to select the highlighted first media identifier element; and wherein the means for selecting the first media asset for presentation is responsive to the means for receiving the instruction to select the highlighted media identifier element.

In some embodiments, the system further comprises: means for receiving a second instruction from a user input device to navigate to a next element along the first direction; means for causing a first related media identifier element at a position of the user interface next to the first position along the first direction to be highlighted in response to receiving the second instruction; means for receiving a third instruction from a user input device to select the highlighted first related media identifier; and means for selecting a first related media asset to present, wherein the first related media asset is associated with the first related media identifier element; means for inhibiting the first media asset from being presented in the first portion of the user interface; and means for causing the first related media asset to be presented in the first portion of the user interface.

In some embodiments, each of the one or more related media identifier elements is a list of related media identifier elements that each identify one of the plurality of identified related media assets, wherein the system further comprises: means for causing a second related media identifier element in a first list of related media identifier elements at a position of the user interface next to the first position along the first direction to be highlighted in response to receiving the second instruction, wherein the first list of related media identifier elements includes the first related media identifier element; means for receiving a fourth instruction from a user input device to select a next element along a second direction orthogonal to the first direction; and means for causing the first related media identifier at a position of the user interface next to the second related media identifier element in the first list along the second direction to be highlighted in response to receiving the fourth instruction.

In some embodiments, the system further comprises causing the first media identifier element to be presented during presentation of the first media asset in a third portion of the user interface that is adjacent to the first portion along the second direction and that is adjacent to the second portion along the first direction.

In some embodiments, the first portion of the user interface coincides with the first position along the first direction.

In some embodiments, the system further comprises: means for receiving an instruction to present the first media asset using an entire screen of a display used to present the user interface; and means for causing the first media asset to be presented using the entire screen of the display.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and/or media) for navigating a user interface while presenting media content are provided.

In some embodiments, the mechanisms described herein can cause a user interface that can be navigated using directional inputs received from a user input device to present related media content. For example, a device using the mechanisms described herein can cause a user interface that includes media identifier elements corresponding to various videos that can be streamed to the device to be presented. These media identifier elements can be presented, for example, in a grid of media identifier elements, as a column of media identifier elements, as a row of media identifier elements, as multiple rows of media identifier elements with each row representing a group of related media assets, and/or using any other suitable technique or techniques.

In some embodiments, the mechanisms described herein can receive directional inputs (e.g., issued by a user input device), and can highlight a particular media identifier based on the received directional input. For example, the mechanisms described herein can cause various media identifiers corresponding to videos to be sequentially highlighted in response to a device using the mechanisms receiving directional inputs. In a more particular example, the mechanisms described herein can cause a first media identifier corresponding to a first video to be highlighted. Upon receiving a request to navigate to the right, the mechanisms described herein can cause a second media identifier corresponding to a second video to be highlighted, where the second media identifier is presented to the right of the first media identifier in the user interface.

In some embodiments, the mechanisms described herein can cause a selected media asset to be presented in response to receiving a selection (e.g., issued by a user input device) of the highlighted media identifier element. Upon the selected media asset being presented, the mechanisms described herein can, in some embodiments, cause media identifiers for related media assets to be presented in a region of the user interface that is not being used to present the media asset. Additionally, in some embodiments, the mechanisms described herein can continue to receive directional inputs and cause the user interface to highlight the related media identifier during presentation of the selected media asset. Upon receiving a selection of a highlighted related media identifier, the mechanisms described herein can cause the related media asset associated with the selected highlighted media identifier to be presented using the user interface and can inhibit presentation of the previously selected media asset.

Figure 1:
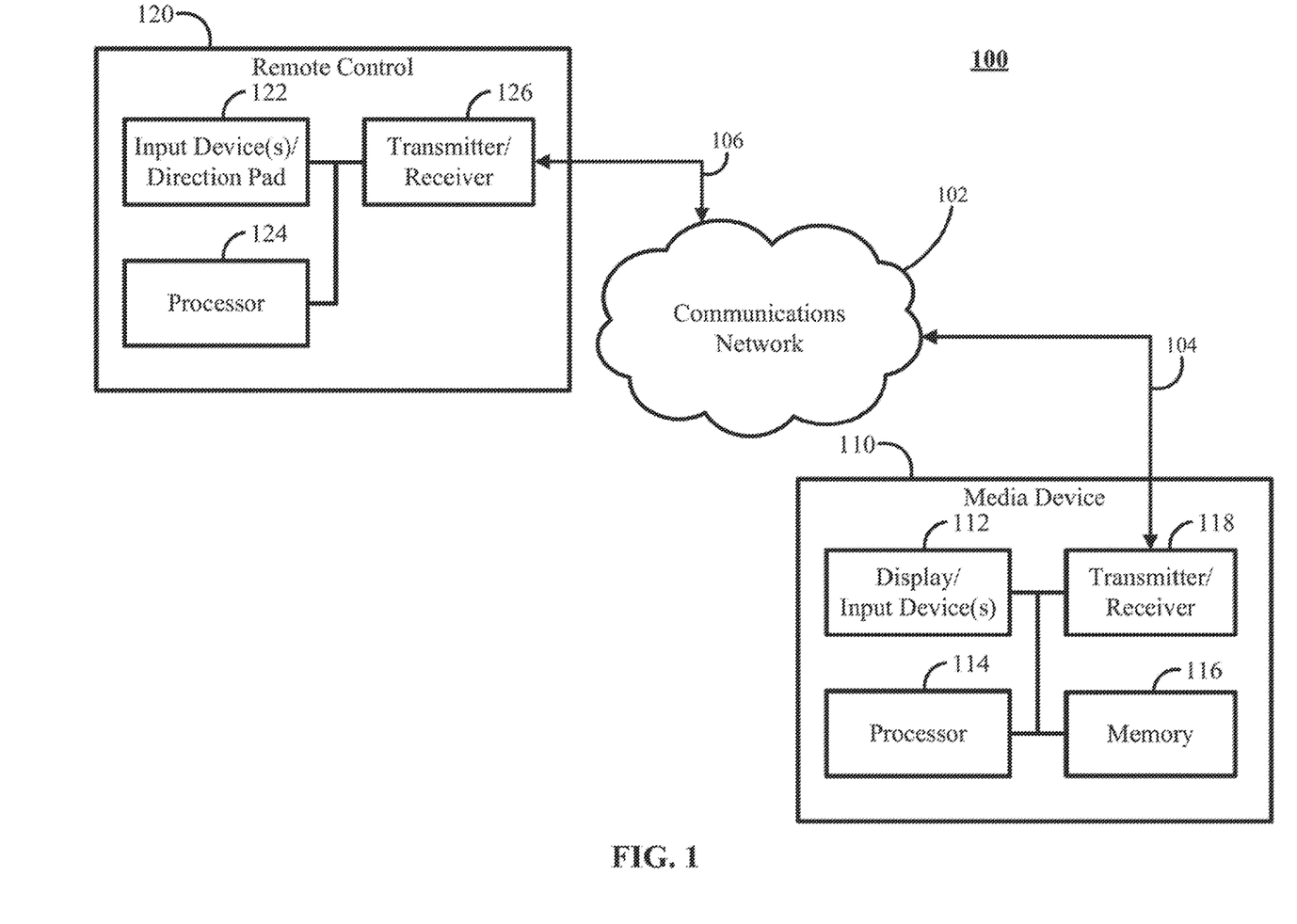
FIG. 1 shows an example of a schematic diagram of a system, including a remote control and a media device, suitable for implementation of mechanisms described herein for presenting related content in a user interface navigated using directional controls in accordance with some embodiments of the disclosed subject matter.

FIG. 1 shows an example 100 of a generalized schematic diagram of a system that includes a media device and a remote control on which the mechanisms for presenting related content in a user interface navigated using directional controls as described herein can be implemented in accordance with some embodiments of the disclosed subject matter. As illustrated, system 100 can include a remote control 120 that can be used to control one or more media devices, such as a media device 110. Remote control 120 can be connected by a communications link 106 to a communications network 102 that can be linked via a communications link 104 to media device 110.

In a more particular example, remote control 120 can include an input device(s)/direction pad 122 and/or any other suitable directional input. In some embodiments, input device(s)/direction pad 122 can include direction pad 322 and select button 324 described below in connection with FIGS. 3A-3G. Additionally or alternatively, any other suitable buttons or other input devices can be included in input device(s)/direction pad 122 such as number buttons, volume and channel controls, etc. In some embodiments, remote control 120 can further include a processor 124, and a transmitter/receiver 126, which can be interconnected with each other and/or with input device(s)/direction pad 122.

In some embodiments, remote control 120 can include memory and/or storage (not shown) for storing a computer program for controlling processor 124. For example, the computer program can be stored in read-only memory (ROM), electrically programmable read only memory (EPROM), electrically erasable programmable read only memory (EEPROM), flash memory, etc.

Processor 124 can use the computer program to cause signals to be transmitted from remote control 120 through communications link 106 and communications network 102 to media device 110 via communications link 104. These signals can be transmitted using transmitter/receiver 126, which can include one or more transmitters, receivers, antennas, transmitter/receivers, etc. Transmitter/receiver 126 can transmit and/or receive signals using any suitable technologies and/or frequencies. For example, transmitter/receiver 126 can transmit and/or receive radio signals, infrared signals, near-infrared signals, ultrasonic signals, etc.

Communications links 104 and 106 can be any communications links suitable for communicating data between remote control 120 and media device 110, such as radio frequency links, infrared links, near-infrared links, wireless links, network links, HDMI links, USB links, any other suitable communications links, or any suitable combination of such links. In some embodiments, communication link 104 and communication link 106 can be the same communication link or different communication links. For example, a radio signal (such as a microwave signal) can be sent from remote control 120 through communications network 102 (e.g., a space between remote control 120 and media device 110), which can then be received at media device 110. In such an example, communication link 104 and communication link 106 are the same (e.g., the microwave signal).

As another example, a radio signal (such as a microwave signal) can be sent from remote control 120 and received at a converter (not shown) that converts the microwave signal to a near-infrared signal. In such an example, the converter can transmit the near-infrared signal, which can then be received by media device 110. In this example, communication link 106 is the radio signal, and communication link 104 is the near-infrared signal and the converter is part of communications network 102.

In some embodiments, input device(s)/direction 122 can include a number of switches that, when activated, indicate a directional input. For example, input device(s)/direction 122 can include a button that a user can press to indicate a direction. This button can activate one or more of the switches, and a signal from the one or more switches can be correlated by processor 124 with a direction indicated by pressing the button.

Input device(s)/direction 122 and processor 124 can be configured to accept any suitable number of inputs for various directions in accordance with some implementations. For example, processor 124 can be configured to detect inputs in four directions (e.g., up, down, left and right) from input device(s)/direction 122. In another example, processor 124 can be configured to detect eight directional inputs (e.g., up, down, left, right and intermediate directions, such as, up-right diagonal, up-left diagonal, down-right diagonal, and down-left diagonal) from input device(s)/direction 122. In yet another example, processor 124 can be configured to detect inputs in any arbitrary direction from input device(s)/direction 122. In such an example, input device(s)/direction 122 can include touch sensors that can be used to detect an arbitrary position of an input to input device(s)/direction 122.

In some embodiments, input device(s)/direction 122 can include any other suitable features such as an alphanumeric keypad, a power button, an input selection button, channel buttons, volume buttons, a volume mute button, media playback buttons (e.g., rewind, pause, play, and fast-forward buttons), a dedicated button that accesses downloadable applications for use by the media device, a microphone or other suitable audio input, a camera, etc. In some embodiments, input device(s)/direction 122 can include hardware buttons and/or software buttons (e.g., programmable buttons). In some implementations, input device(s)/direction 122 can also include other inputs, such as, a computer keyboard, a cursor-controller, a dial, a switchbank, a lever, a touchscreen, and/or any other suitable input device.

In some embodiments, system 100 can include one or more media devices 110, such as a media playback device for viewing media content listings and/or obtaining and presenting content items from various sources (e.g., broadcast content, on-demand content, locally stored content, Internet content, etc.). In some embodiments, remote control 120 and media device 110 can be local to each other or remote from each other. For example, remote control 120 and media device 110 can be located in the same room. In some embodiments, media device 110 can execute process 200 and/or present user interface 300, as described below in connection with FIGS. 2 and 3A-3G, respectively.

In some embodiments, media device 110 can include a display/input device 112, a processor 114, memory 116, and one or more transmitters, receivers, and/or transmitter/receivers 118, which can be interconnected.

In some embodiments, memory 116 can include a storage device, such as a hard drive, a digital video recorder, a solid state storage device, a removable storage device, or any other suitable device for storing guidance information and/or remote control instructions. In a more particular example, the storage device can store a computer program for controlling processor 114 in media device 110 (e.g., responsive to instructions received from remote control 120).

Processor 114 can use the computer program to present content on display/input device 112 and control a user interface, which can include user interface 300 as described below in connection with FIGS. 3A-3G, to allow a user to interact with the displayed content and to send and receive data through communication link 104 using transmitter/receiver 118. In some embodiments, transmitter/receiver 118 can transmit and/or receive radio signals, infrared signals, near-infrared signals, ultrasonic signals, etc. In cases where transmitter/receiver 126 of remote control 120 and transmitter/receiver 118 operate using different types of signals, a converter (not shown) can be used to convert instructions transmitted using one type of signal (e.g., a radio signal) to another type of signal (e.g., a near-infrared signal). It should be noted that data received through communications link 104 or any other communications links can be received from any suitable source. It should also be noted that transmitter/receiver 126 and transmitter/receiver 118 can operate using any suitable type of signals or combination thereof, including digital signals and/or analog signals.

Display/input device 112 can include input devices such as a computer keyboard, a cursor-controller, one or more buttons, a dial, a switchbank, a lever, a touchscreen, and/or any other suitable input device.

In some embodiments, remote control 120 and media device 110 can be any of a general purpose device such as a computer or a special purpose device such as a remote control, a smartphone, a tablet computer, a set-top box, a smart TV, a game console, a gamepad (e.g., a controller for a game console), a digital media receiver, a server, etc., or any suitable combination of such devices. Any of these general or special purpose devices can include any suitable components such as a hardware processor (which can be a microprocessor, digital signal processor, a controller, etc.), memory, communication interfaces, display controllers, input devices, etc. For example, media device 110 can be implemented as a set-top box, a digital media receiver, a smart TV, a television, a laptop computer, a personal computer, a server, a smartphone, a tablet computer, a game console, etc. In some embodiments, media device 110 can include a combination of devices, such as a television and a game console, or a television and a digital media receiver, where a first device (e.g., the game console or the digital media receiver) can execute the mechanisms described herein for presenting related content in a user interface navigated using directional controls, and a second device (e.g., the television) can be used to present a user interface for presenting related content in the user interface navigated using directional controls. Additionally or alternatively, instructions from a remote control can be received by a device that is not executing the mechanisms described herein (e.g., a television, a second screen device such as a smartphone, a game console) and these instructions can be relayed to a device that is executing the mechanisms described herein such as a digital media receiver, a streaming media device, or any other suitable device executing the mechanisms described herein.

Figure 2:
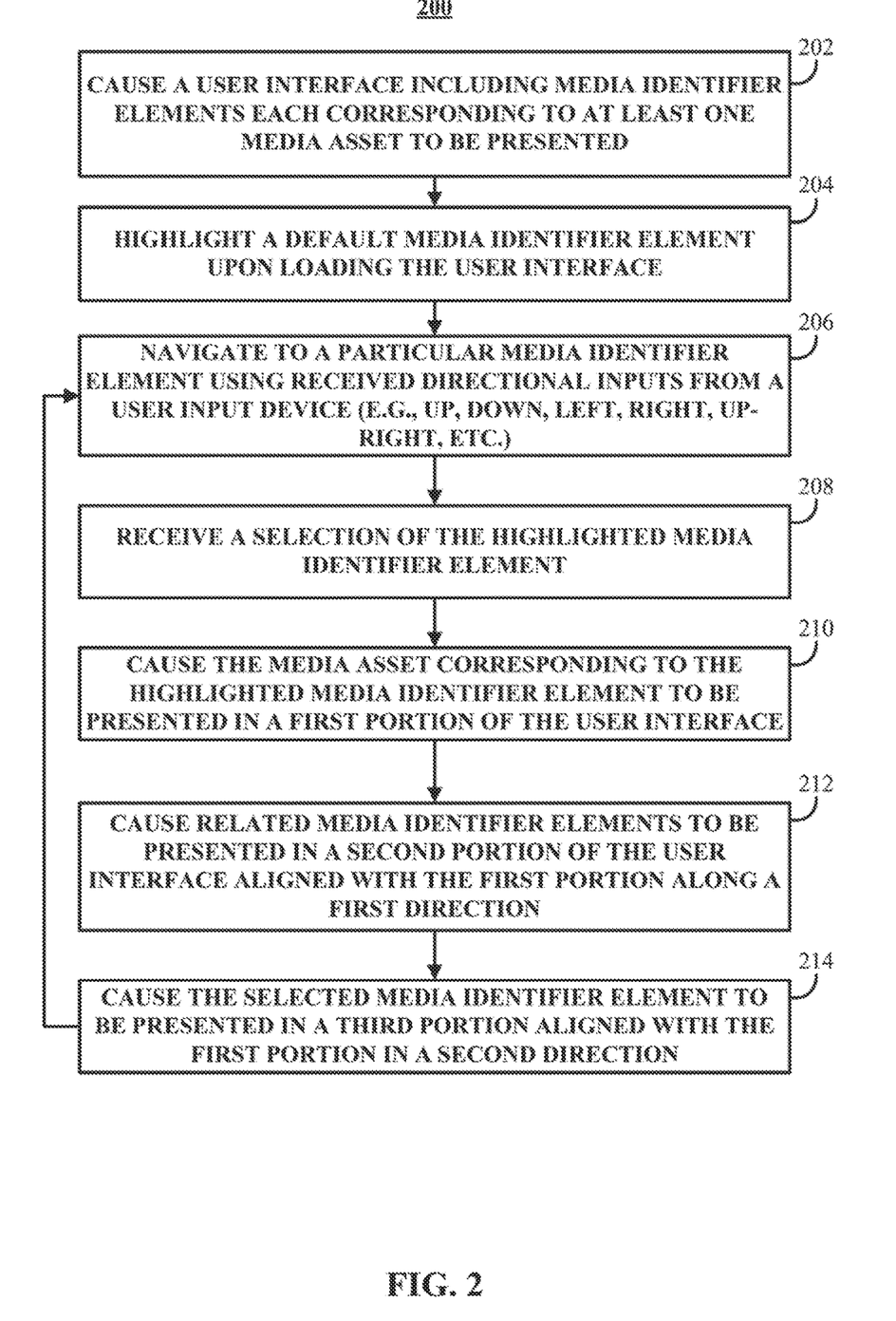
FIG. 2 shows an example of a process for presenting related content in a user interface navigated using directional controls in accordance with some embodiments of the disclosed subject matter.

Turning to FIG. 2, an example 200 of a process for presenting related content in a user interface navigated using directional controls is shown in accordance with some embodiments of the disclosed subject matter. In some embodiments, process 200 can begin at 202 by causing a user interface that includes media identifier elements to be presented. In some embodiments, each of the media identifier elements can be associated with one or more particular media assets. For example, the user interface presented at 202 can be a user interface for selecting a media asset and the media identifier elements can identify the media asset.

In some embodiments, media identifier elements can identify any type of media asset. For example, media assets can include audio and/or video media. As another example, media assets can include print media or image media. As still another example, media assets can include a collection of media assets, such as a playlist of videos, a playlist of songs, a collection of images, etc. As a further example, media assets can include subscription based media, such as podcasts, online magazine subscriptions, etc. As another further example, media assets can include interactive media, such as applications and video games. As another further example, media assets can include any suitable combinations of these assets and/or any other suitable assets.

In some embodiments, the media assets can be stored locally on a device executing process 200 (e.g., media device 110) and/or remotely. For example, media assets can include media assets such as video files or audio files that are stored locally and can be played back, copied, deleted, organized and/or otherwise used by the device executing process 200. As another example, media assets can include streaming media assets such as streaming video assets, streaming audio assets, live streamed video, live streamed audio, and/or any other media asset that can be streamed by the device executing process 200. As still another example, media assets can include media assets available for download to the device executing process 200 by purchasing the asset, borrowing the asset, renting the asset, as a freely downloadable asset, etc. Additionally or alternatively, in some embodiments, an identifier element that identifies any sort of asset can be included in the user interface. For example, search results can be presented in the user interface and identifiers for the search results can be presented with, or in lieu of, the media identifier elements. Note that search results can be search results that include media identifier elements.

In some embodiments, media identifier elements can include any suitable information for presentation. For example, media identifier elements can include images, text, video, audio, and/or any other suitable information for presentation. In some embodiments, how a particular media identifier element is presented can be based on one or more items of metadata associated with the media asset with which the media identifier is associated. For example, the media identifier element can include title information based on title metadata of the media asset. As another example, the media identifier element can include an image based on thumbnail metadata of the media asset and/or a frame of image data from the data of the media asset.

In some embodiments, how the media identifier element is presented can be based on a type of media asset with which the media identifier element is associated. For example, a media identifier element for a video asset can include information identifying the media asset as a video. As another example, the media identifier element for a playlist of media assets can include information identifying the media asset as a playlist of other media assets.

In some embodiments, the user interface can have any suitable layout and can include selectable and non-selectable elements. For example, the user interface can include graphical elements that are non-selectable, such as background graphics, descriptive information of other elements in the user interface, and/or any other suitable non-selectable graphics. As another example, the user interface can include graphical elements that are selectable such as the media identifier elements described herein, one or more menu elements and/or menu option elements, navigational elements, and/or any other suitable selectable elements. In some embodiments, the user interface can include one or more hidden elements that can be navigated to by a user performing a suitable action. Such hidden elements can be selectable and/or non-selectable. Additionally or alternatively, selectable elements can become non-selectable elements and vice versa by a user performing a suitable action, in some embodiments.

In some embodiments, a group or groups of media identifier elements can be presented within the user interface in any suitable arrangement. For example, the media identifier elements can be arranged as a column of media identifier elements. As another example, the media identifier elements can be arranged as a row of media identifier elements. As yet another example, the media identifier elements can be arranged as a grid of media identifier elements. As still another example, the media identifier elements can be arranged in any suitable pattern. As a further example, the media identifier elements can be arranged in a non-uniform pattern within the user interface (e.g., scattered randomly about the user interface). In some embodiments, the media identifier elements can be presented with any suitable spacing. For example, the media identifier elements can be presented as tiles that are directly adjacent to one another (e.g., by row, by column, in a grid, etc.). As another example, media identifier elements can be presented using uniform spacing in one or more directions. In a more particular example, media identifier elements in a same row (or column) can be uniformly spaced. In another more particular example, a space between rows (or columns) of media identifier elements can be uniform. As yet another example, spacing between media identifier elements can be based on an amount of available space in the user interface, a number of media identifier elements being presented, and/or any other suitable factors. In some embodiments, spacing of media identifier elements can be dynamic and/or can be based on a layout of one or more other elements that that are presented by the user interface.

In some embodiments, one or more of the media identifiers at various positions within the user interface can be different sizes, where the size of a media identifier can be based on any suitable factor or factors. For example, the size of the media identifier element can be based on the position of the media identifier element in the user interface. As another example, the size of the media identifier element can be based on the amount of information presented by the media identifier element in the user interface (e.g., a media identifier element with a longer title can be larger). As yet another example, the size of the media identifier element can be based on the length and/or size of the media asset to which the media identifier elements corresponds (e.g., a longer video asset can have a larger media identifier element). As still another example, the size of the media identifier element can be based on an importance of the media asset to which the media identifier corresponds, which importance can be determined on any suitable basis (e.g., user assigned, by popularity, etc.).

Figure 3A:
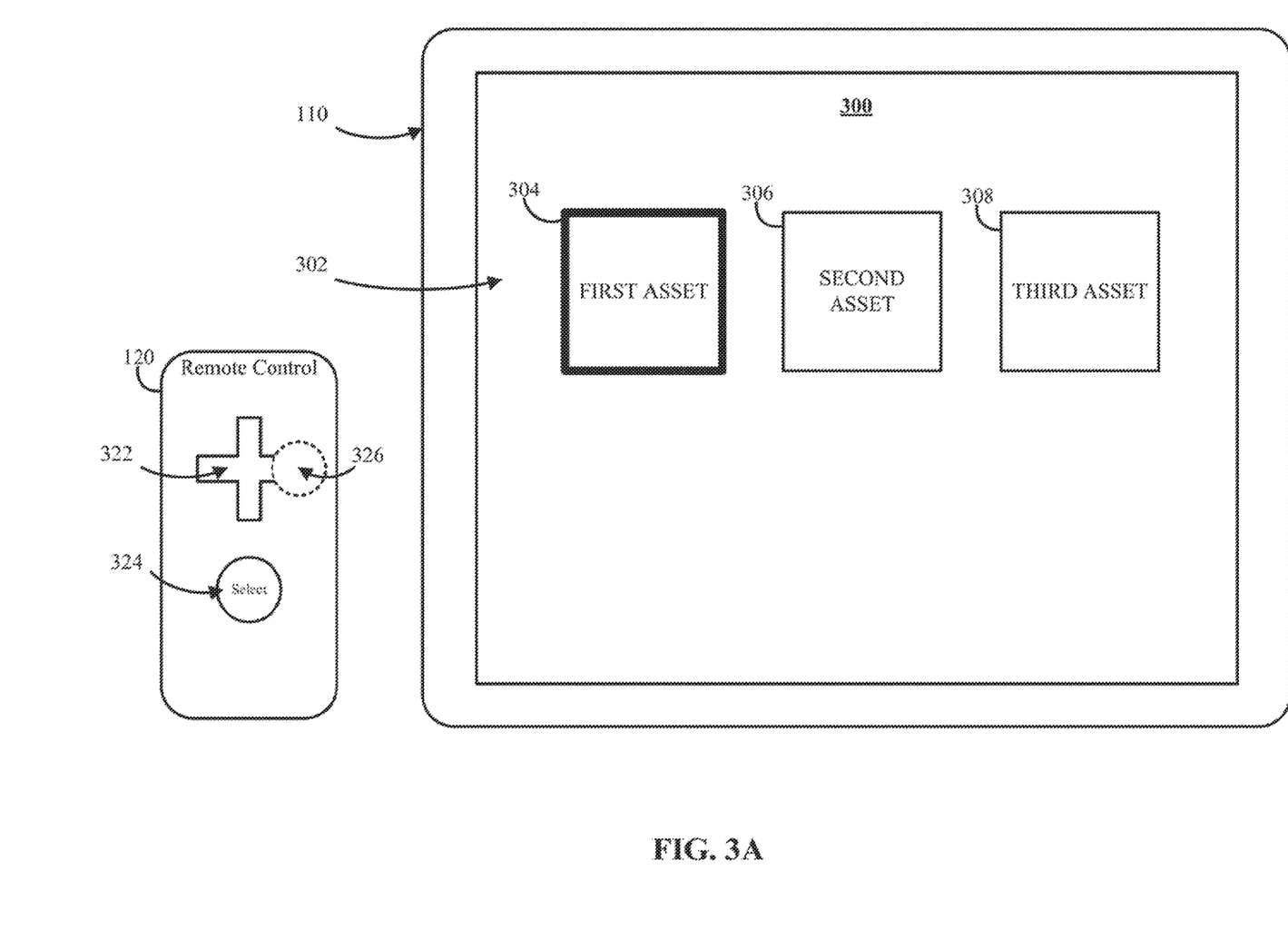
FIGS. 3A-3G show examples of a user interface for presenting related content in a user interface navigated using directional controls in accordance with some embodiments of the disclosed subject matter.

FIG. 3A shows an example 300 of a user interface in accordance with some embodiments of the disclosed subject matter. As shown in FIG. 3A, media device 110 can include a display 302 (which can be part of display 112, described above in connection with FIG. 1) on which user interface 300 can be presented. User interface 300 can include various media identifier elements 304-308 corresponding to different media assets. In some embodiments, user interface 300 can include any other suitable elements or other user interface components.

In some embodiments, a currently selectable element of user interface 300 can be highlighted. For example, as shown in FIG. 3A, media identifier element 304 is highlighted.

In some embodiments, a user input device can be used to control navigation of a user interface in accordance with some embodiments of the disclosed subject matter. For example, as shown in FIG. 3A, remote control 120 can be used to navigate user interface 300. In a more particular example, directional inputs to a direction pad 322 (which can be part of input device(s)/direction pad 122 described above in connection with FIG. 1) can cause remote control 120 to issue directional inputs to a device executing the mechanisms described herein. For example, remote control 120 can issue a "right" directional command in response to a press of direction pad 322 in an area shown with dotted circle 326 (which can correspond to a user pressing direction pad 322). In some embodiments, remote control 120 can include an input for selecting a currently highlighted element, such as a select button 324 (which can be part of input device(s)/direction pad 122 described above in connection with FIG. 1). For example, remote control 120 can issue a command that indicates selection of a currently highlighted element of user interface 300 in response to a press of select button 324.

Returning to FIG. 2, at 204, process 200 can cause a particular media identifier element to be highlighted. In some embodiments, process 200 can cause a default media identifier element to be highlighted. For example, a media identifier element at a particular position can be highlighted initially after process 200 starts. The default media identifier element can be any media identifier element in any suitable position, such as an upper left media identifier element, a center media identifier element, a left-center media identifier element, or any other suitable position. Additionally or alternatively, process 200 can cause a media identifier to be highlighted in response to receiving a directional input. For example, until a directional input is received, process 200 can inhibit any media identifier from being highlighted, and, upon receiving a directional input, can highlight a media identifier element based on the input. The media identifier element that is highlighted in response to receiving the directional input can be a media identifier element at a position based on the directional input (e.g., an upper media identifier element can be highlighted in response to receiving an "up" input), and/or can be a media identifier element at a default position (e.g., where there are multiple default positions and a directional input selects among the multiple default positions). In some embodiments, a media identifier element can be highlighted in response to navigation from a non-media identifier element that was highlighted (e.g., in response to directional inputs).

In some embodiments, a media identifier element can be highlighted using any suitable technique or combination of techniques. For example, a media identifier element can be highlighted by surrounding the element with a border of a particular color, brightness, pattern, etc. As another example, a color, shape, size, and/or any other suitable property or properties of the highlighted media identifier element can be altered with respect to other media identifier elements to indicate which media identifier element is highlighted. As yet another example, the highlighted media identifier element can be identified using text, graphics, or any other technique to differentiate the highlighted media identifier element. As still another example, the highlighted media identifier element can begin previewing the media asset to which it corresponds (e.g., can begin playing video of a video asset) to indicate that it is the highlighted media identifier element.

At 206, process 200 can receive any suitable directional inputs to navigate to a particular media identifier element using the received directional inputs. In some embodiments, process 200 can receive any suitable directional input such as up, down, left, right, diagonals (e.g., up-right, down-left, etc.), analog directional inputs (e.g., received from an analog stick on a game controller), and/or any other suitable directional inputs. In some embodiments, the directional input can be a discrete and directionally constrained input, such as a directional input received from a direction pad on a remote control, as opposed to a non-constrained input received from a pointing device such as a mouse or track pad. Note that, in some embodiments, a directional input, such as a swipe or flick, from a touch interface can be a directional input as described herein.

In some embodiments, the directional input can be received by a device executing process 200 as a command or instruction from an input device (e.g., remote control 120). For example, if the device executing process 200 is a television, the directional input can be received from a television remote control or a universal remote control. As another example, if the device executing process 200 is a game console, the directional input can be received from a controller associated with the game console. Additionally or alternatively, the directional input can be received by another device, and relayed to the device executing process 200. For example, if the device executing process 200 is a digital media receiver, the directional input can be received by a television to which the digital media receiver is coupled, and can be relayed to the digital media receiver using any suitable technique (e.g., using a communications protocol such as consumer electronics control (CEC), using an infrared blaster, over a network to which both are coupled such as a local area network, etc.). As another example, if the device executing process 200 is a television, the directional input can be received by a game console coupled to the television (e.g., from a controller associated with the game console), and can be relayed to the digital media receiver using any suitable technique (e.g., using CEC, or any other suitable communication protocol over any suitable communications link).

In some embodiments, the directional inputs received at 206 can be directional inputs received in response to a user pressing direction pad 322 of remote control 120 (e.g., represented by dashed circle 326) as shown in FIG. 3A. In some embodiments, navigation to a particular media identifier element can include causing a currently selectable media identifier element to be highlighted as directional inputs are received. For example, process 200 can cause media identifier element 306 to be highlighted, as shown in FIG. 3B, and inhibit media element 304 from being highlighted in response to receiving the "right" directional input that was generated by remote control 120 in response to selection of the "right" part of direction pad 322 (e.g., as represented by dashed circle 326 in FIG. 3A).

Returning to FIG. 2, at 208, process 200 can receive an instruction(s) to select the currently highlighted media identifier element. In some embodiments, process 200 can receive any suitable selection instruction(s). In some embodiments, the selection instruction(s) can be received by a device executing process 200 as a command or instruction from an input device (e.g., remote control 120). For example, if the device executing process 200 is a television, the selection instruction(s) can be received from a television remote control or a universal remote control. As another example, if the device executing process 200 is a game console, the selection instruction(s) can be received from a controller associated with the game console. Additionally or alternatively, the selection instruction(s) can be received by another device, and relayed to the device executing process 200. For example, if the device executing process 200 is a digital media receiver, the selection instruction(s) can be received by a television to which the digital media receiver is coupled, and can be relayed to the digital media receiver using any suitable technique (e.g., using a communications protocol such as consumer electronics control (CEC), using an infrared blaster, over a network to which both are coupled such as a local area network, etc.). As another example, if the device executing process 200 is a television, the selection instruction(s) can be received by a game console coupled to the television (e.g., from a controller associated with the game console), and can be relayed to the digital media receiver using any suitable technique (e.g., using CEC, or any other suitable communication protocol over any suitable communications link).

Figure 3B:
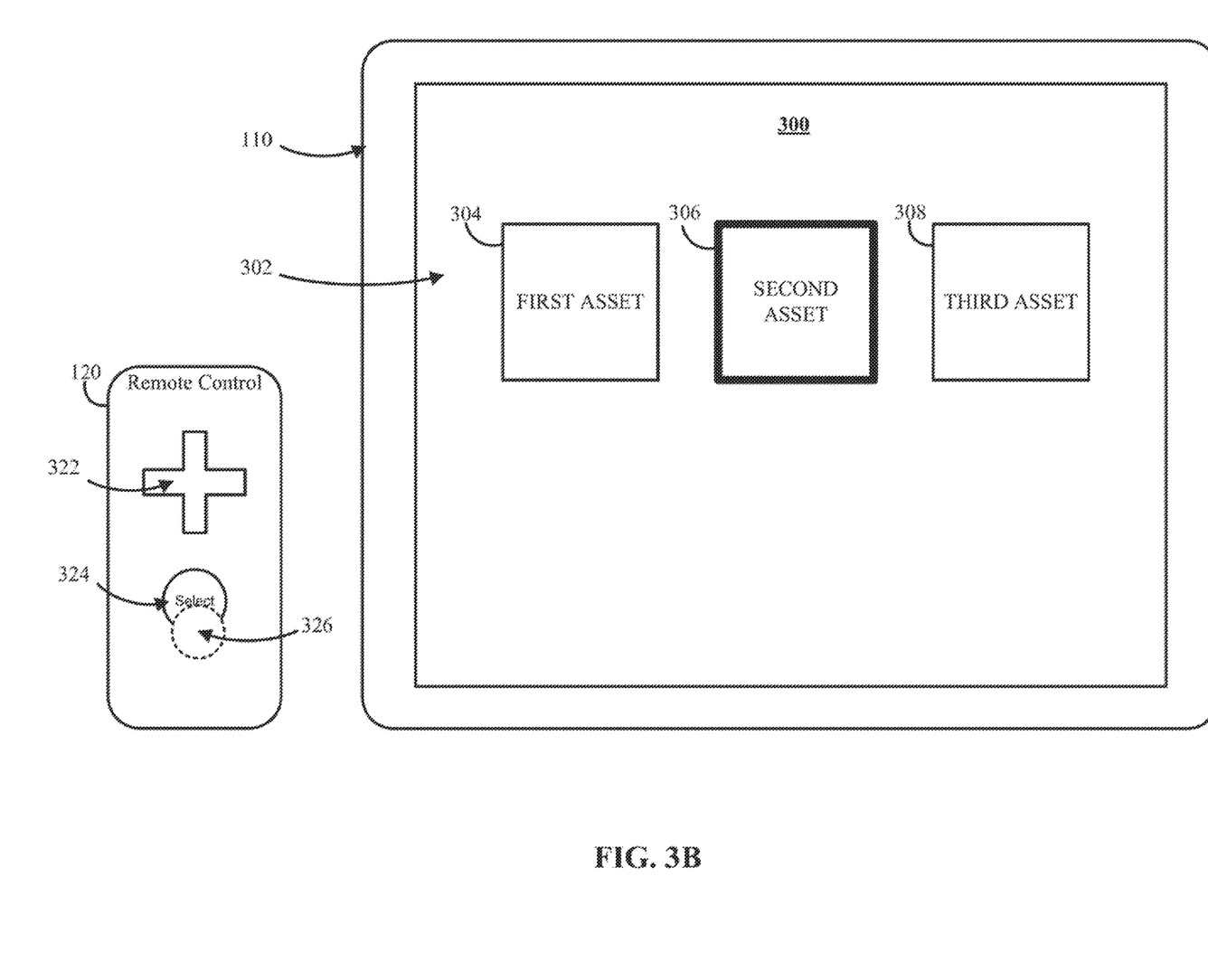

In some embodiments, the selection instruction(s) received at 208 can be a selection instruction(s) received in response to a user pressing select button 324 of remote control 120 (e.g., represented by dashed circle 326 as shown in FIG. 3B).

Figure 3C:
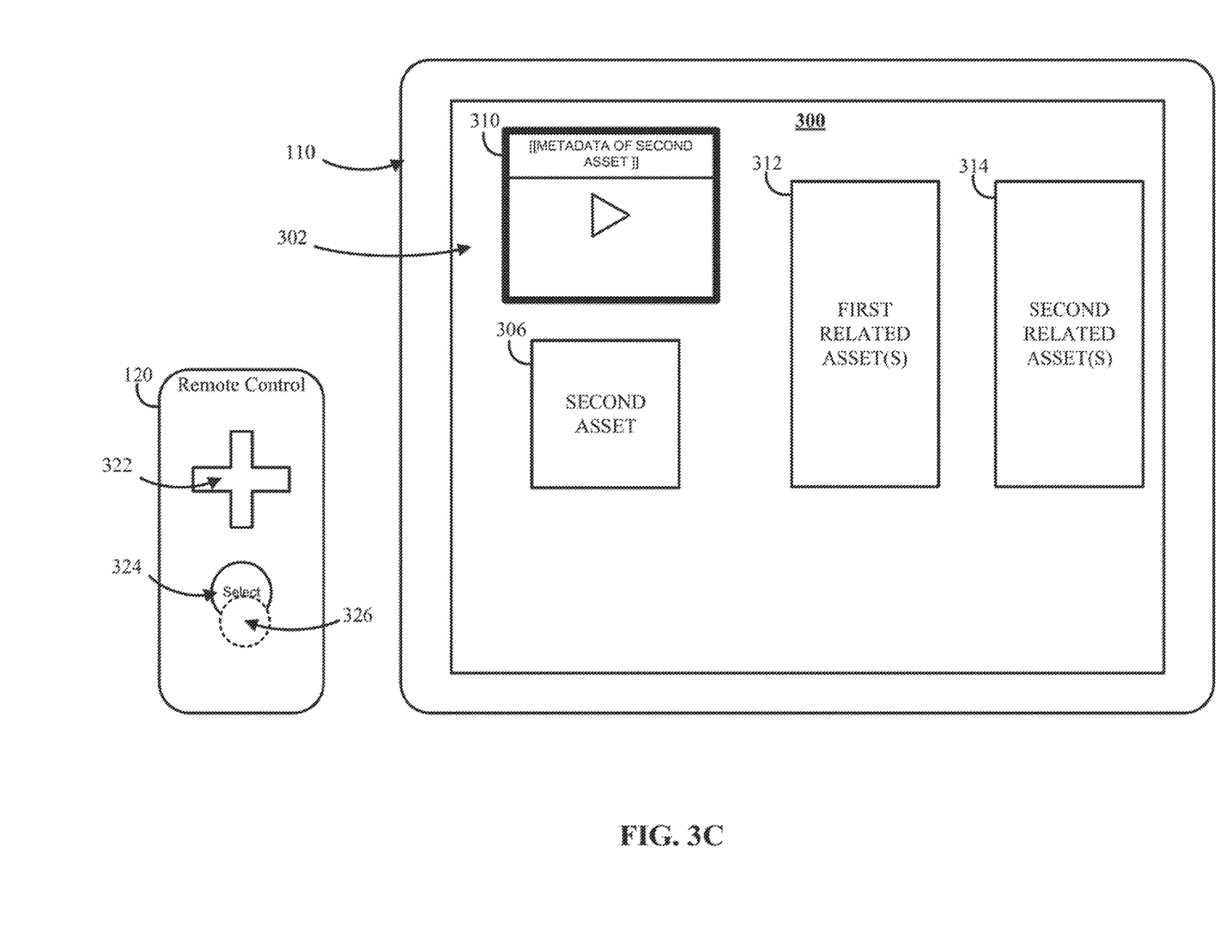

At 210, process 200 can cause the media asset(s) corresponding to the currently highlighted media identifier element to be presented. In some embodiments, the media asset can be presented using any suitable technique or combination of techniques, and can be presented in any suitable portion of the user interface (e.g., user interface 300). For example, a media asset corresponding to the media identifier selected at 208 can be presented in a first portion of the user interface. In a more particular example, as shown in FIG. 3C, a media asset 310 corresponding to media identifier element 306 selected at 208 (e.g., as shown in FIG. 3B) can be presented in a first portion of user interface 300. Although media asset 310 is shown in FIG. 3C as being a video, media asset can include any suitable content as described above in connection with 202 of FIG. 2. A size and/or location of the portion of user interface 300 in which the media asset is presented at 210 can be based on any suitable factors and/or can be determined using any suitable technique or combination of techniques. For example, process 200 can determine the size and/or location of presentation based on the type of media asset to be presented. In a more particular example, video assets, audio assets, image assets, and/or document assets can be presented in a portion of user interface 300 at different sizes based on the properties of those asset types and/or properties of the assets themselves. A video asset can be presented in a larger portion than an audio asset due to the larger amount of visual information included in the video asset, and a document asset can be presented in a larger portion than a video asset due to text that may be difficult to read/comprehend at a smaller size.

As another example, process 200 can determine the size and/or location of presentation based on the characteristics of the media asset. For example, if an audio asset is associated with an image (e.g., cover art), the size and/or location of the media asset during presentation (e.g., controls, cover art and/or metadata associated with the media asset) can be based on the resolution and/or size of the image. As yet another example, process 200 can determine the size and/or location of presentation based on a device being used to present the user interface and/or the media asset. In a more particular example, if a device presenting user interface 300 is a smartphone having a relatively small screen, the size of the media asset can be made relatively large compared to the size of the screen. If, on the other hand, the device presenting user interface 300 is a television having a relatively large screen, the size of the media asset can be made relatively small compared to the size of the screen.

At 212, process 200 can cause related media identifier elements to be presented, where the related media identifier elements correspond to media assets that are related to the media asset that is being presented. In some embodiments, related media assets can be identified using any suitable technique or combination of techniques. For example, related media assets can be identified based on similarities between the content of the media asset being presented and the content of the related media assets. In a more particular example, similarity between the content of the presented media asset and the content of the related media assets can be based on one or more characteristics of the presented media asset. As another example, related media assets can be identified based on similarities in the creator(s), owner(s), performer(s) and/or any other persons of entities associated with the content. In a more particular example, related media assets can be media assets owned by, created by, etc., the same or an overlapping group of entities and/or individuals. As yet another example, related media assets can be identified based on the media assets being part of a predetermined group of media assets, such as a television series, an album, a series of movies, a series of books, a user created playlist, an automatically generated playlist, etc. As still another example, related media assets can be identified based on a cluster analysis of the media asset being presented and the related media assets. In a more particular example, cluster analysis can be used to determine which media assets are related based on the behavior of users that request the media assets. The cluster analysis can determine which media assets are requested by the same users, and whether the users actively or passively indicated that the media assets were interesting. In one particular example, a user can actively indicate that the content is interesting to the user by indicating that the user enjoyed the content (e.g., by selecting a "thumbs up" icon, a "like" button, etc.). In another particular example, a user can passively indicate that the content is interesting to the user by allowing the content to be presented for a longer period of time (e.g., by watching the entirety of a video, by not skipping an audio track, etc.). In some embodiments, the related media assets can be identified from a group of media assets from which the currently presented media asset was selected (e.g., media assets 304 and 308 as shown in FIG. 3A). Any suitable combination of the foregoing techniques and/or any other suitable techniques can be used to identify related media assets. Additionally, in some embodiments, related media identifier elements can be identified randomly, based on popularity, and/or based on any other suitable criteria or criterion.

In some embodiments, process 200 can cause related media identifier elements to be presented and/or can identify related media assets in response to user viewing habits or navigation by the user. For example, process 200 can determine that all of the media assets in a list of related media assets (e.g., a playlist of media assets) have been viewed. Process 200 can identify additional related media identifiers based on the media assets in the list of related media assets. Additionally or alternatively, process 200 can cause additional related media identifiers to be presented upon presentation of the list of related media assets being completed. As another example, process 200 can determine that all (or a relatively large proportion, e.g., 75-90%) of the media identifiers in a list of related media identifiers (e.g., a playlist) have been navigated through. Process 200 can identify additional related media identifiers based on the media assets in the list of related media assets. Additionally or alternatively, process 200 can cause additional related media identifiers to be presented upon presentation of the list of related media assets being completed. In some embodiments, process 200 can use the determinations in the foregoing examples can be used in determining whether a user has passively indicated interest in particular types of content. By viewing or navigating through an entire list of content, process 200 can determine that the user is interested in similar content to the content in the list.

In some embodiments, related media identifier elements can correspond to a single media asset, or can correspond to multiple media assets. For example, a related media identifier element can correspond to a single media asset such as a single video, a single audio file, a single document, a single image or a single slideshow of images, etc. As another example, a related media identifier element can correspond to multiple media assets, such as a playlist of videos, a predetermined group of audio files (e.g., an album), a list of image slideshows, a list of documents, etc. Additionally, in some embodiments, a related media identifier element can correspond to multiple media assets that include different types of content.

As shown in FIG. 3C, a related media identifier elements 312-314 can be presented using user interface 300. In some embodiments, related media identifier elements 312-314 can be presented in a second region that is aligned with the first region. As shown in FIG. 3C, related media identifier elements 312-314 can be generally aligned in the horizontal direction with media asset 310 that is being presented. Although two related media identifiers are shown, and are shown as being generally aligned with media asset 310 in the horizontal direction, this is merely an example, and any suitable number of related media assets can be identified and the corresponding media identifier elements can be presented using any suitable arrangement.

At 214, process 200 can cause the selected media identifier element to be presented in a third portion of the user interface that is aligned with the first portion in a second direction. In some embodiments, the media identifier element selected at 208 can be presented with the media asset that is being presented using the user interface. For example, as shown in FIG. 3C, media identifier element 306, which was selected at 208 (as shown in FIG. 3B), can be presented using user interface 300. In some embodiments, as shown in FIG. 3C, media identifier 306 can be presented in a third portion of user interface 300 that is aligned with media asset 310. In some embodiments, media identifier 306 can be generally aligned in the vertical direction with media asset 310 that is being presented, and can be generally aligned in the horizontal direction with first related media identifier element 312 and second related media identifier element 314. Although media identifier 306 is shown as being presented concurrently with presentation of media asset 310 aligned in a generally vertical direction, this is merely an example, media identifier element 306 can be presented in any suitable location, at any suitable size, and/or can be presented using any other suitable arrangement. In some embodiments, media identifier element 306 can be omitted during presentation of media asset 310 in the first portion of user interface 300.

Figure 3D:
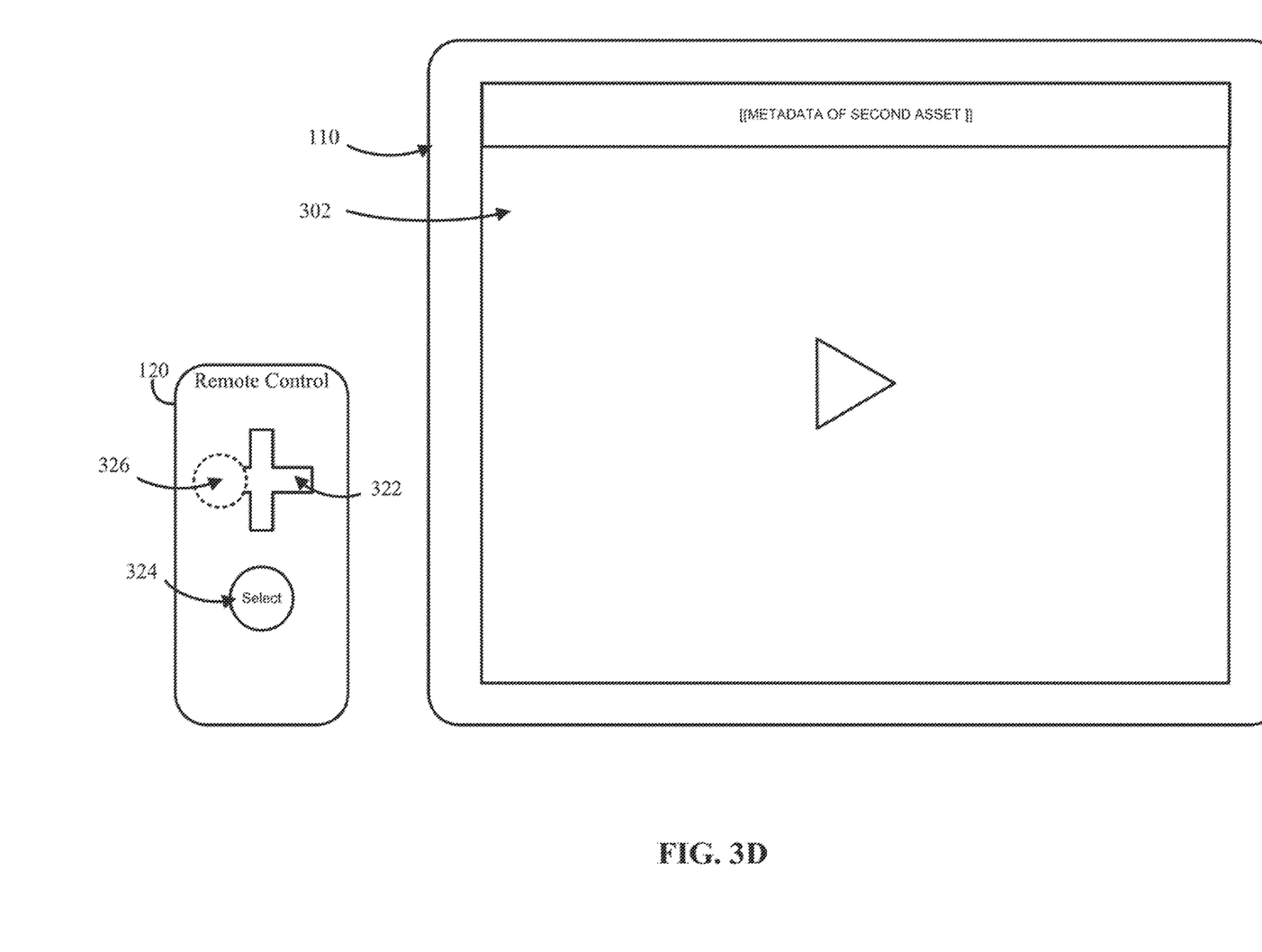
Figure 3E:
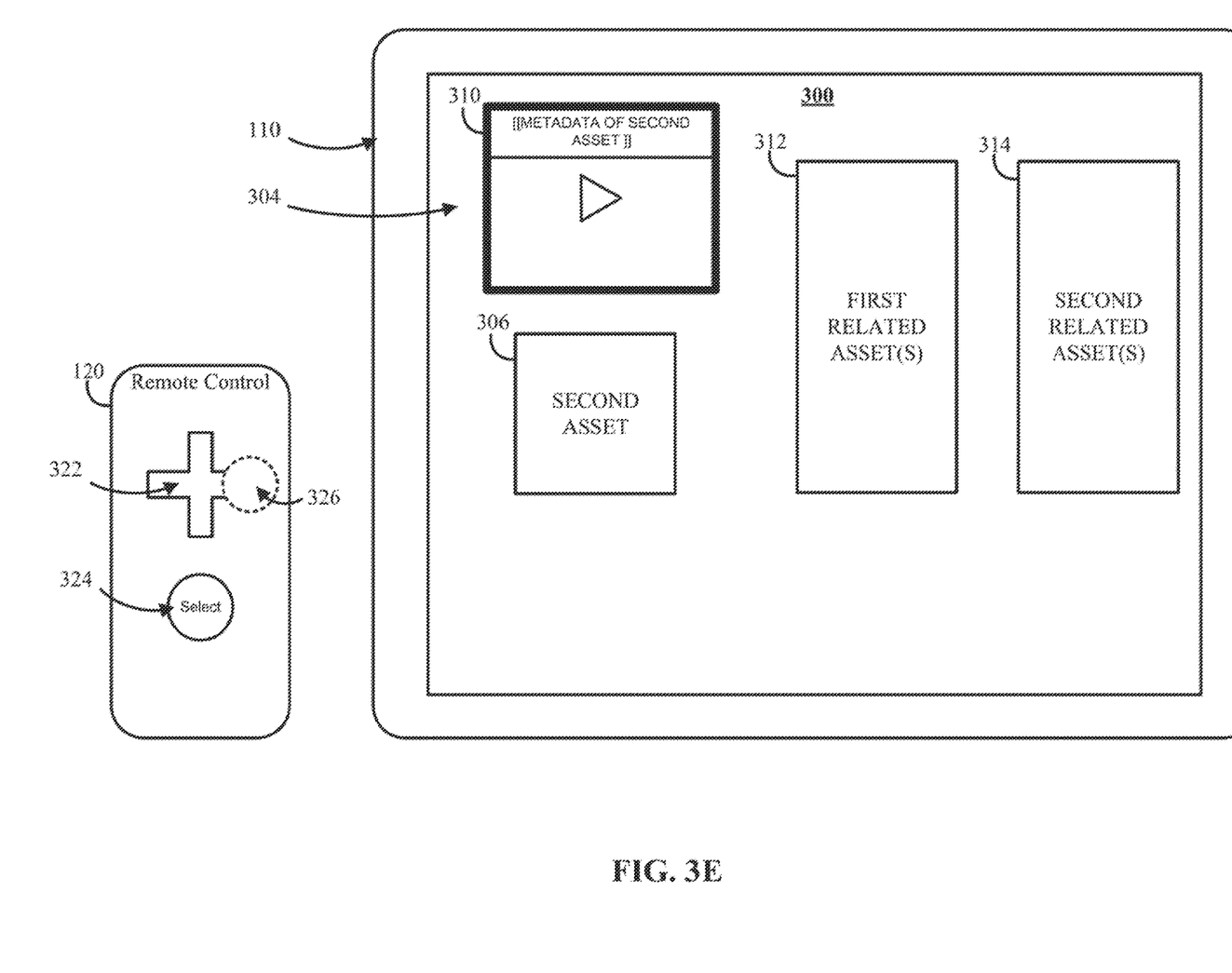

In some embodiments, process 200 can return to 206 and continue to receive directional inputs to navigate the user interface and highlight media identifier elements. Additionally, a device executing process 200 can execute other processes for navigating the user interface and/or for performing any other suitable actions. For example, as shown in FIG. 3C, during presentation of media asset 310, an input to remote control 120 (e.g., pressing select button 324 as represented by dashed circle 326 in FIG. 3C) can cause media asset 310 to be presented in a full screen mode (or another mode where media asset 310 is presented in a larger size) as shown in FIG. 3D. Additionally or alternatively, another button or user interface of remote control 120 can be used to enter a full screen mode for presentation of media asset 310. In some embodiments, an input to remote control 120 (e.g., pressing "left" on direction pad 322 as represented by dashed circle 326 in FIG. 3D) can cause user interface 300 to present a previous screen as shown in FIG. 3E. In some embodiments, if there are no selectable media elements in a particular direction, process 200 can perform a different action other than navigating to a next selectable user interface element. For example, as described above, in situations where there is no selectable user interface element to the left, user interface 300 to navigate to a previous screen in response to receiving a "left" directional input.

In some embodiments, process 200 can receive a directional input (e.g., in response to a user pressing "right" on direction pad 322 as represented by dashed circle 326 in FIG. 3E) to navigate to a different selectable user interface element. For example, during presentation of media asset 310, process 200 can receive a "right" directional input at 206 and can navigate to first related media identifier 312.

Figure 3F:
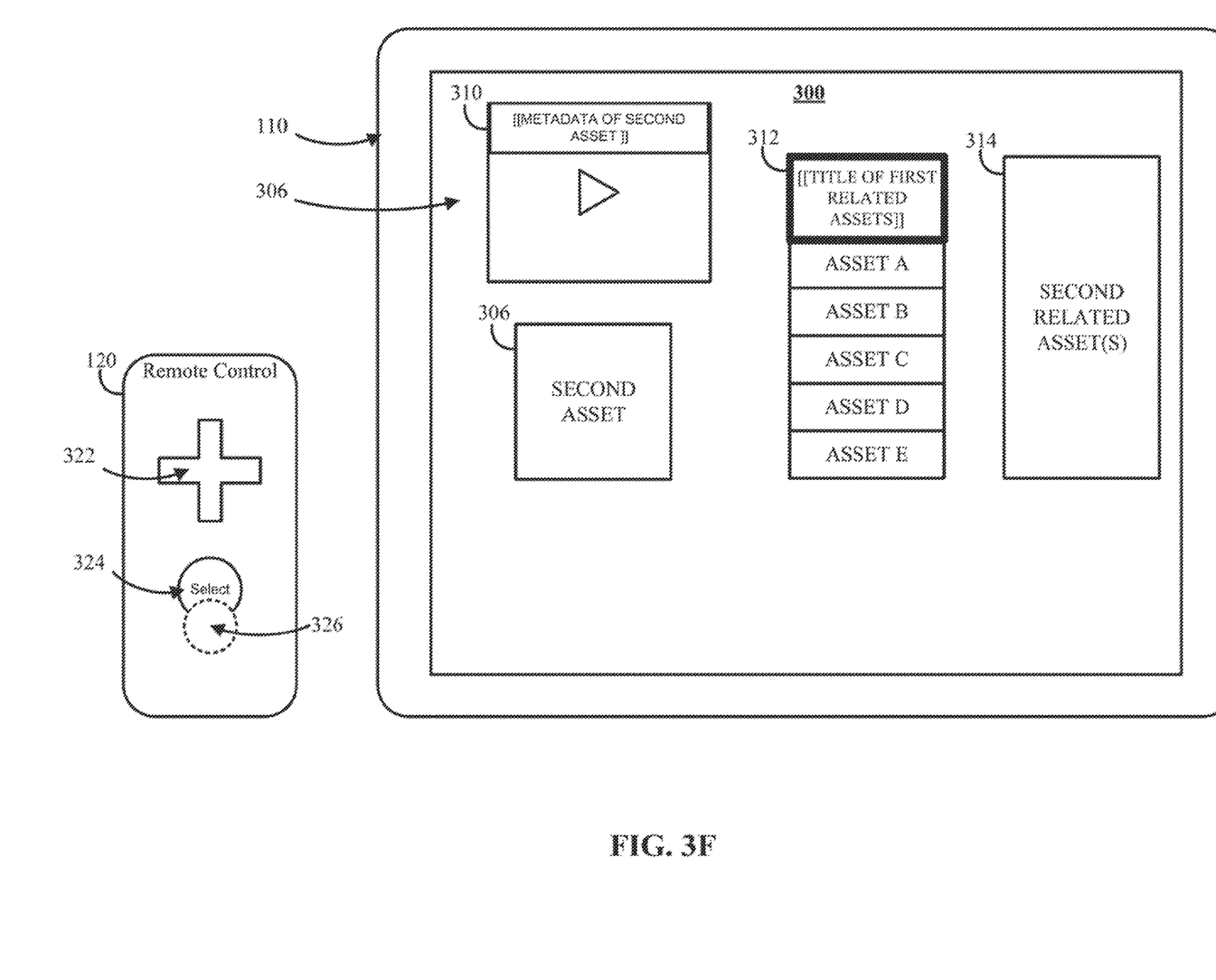

As shown in FIG. 3F, related media identifier element 312 can correspond to multiple media assets (e.g., related media assets A-E) which can each be identified by a selectable media identifier element. Additionally, in some embodiments, the group of related media assets represented by related media identifier element 312 can include metadata such as a title of the first related media assets (e.g., a title of a playlist including media assets A-E). In some embodiments, the metadata of related media identifier element 312 can be a selectable element which can cause presentation of the group of related media assets (e.g., in order first presenting asset A, then asset B, and so on, in groups, etc.). For example, as shown in FIG. 3F, the metadata of related media identifier 312 can be highlighted for selection of the playlist. Additionally or alternatively, in some embodiments, each media identifier element associated with media identifier element 312 can be individually selectable.

Figure 3G:
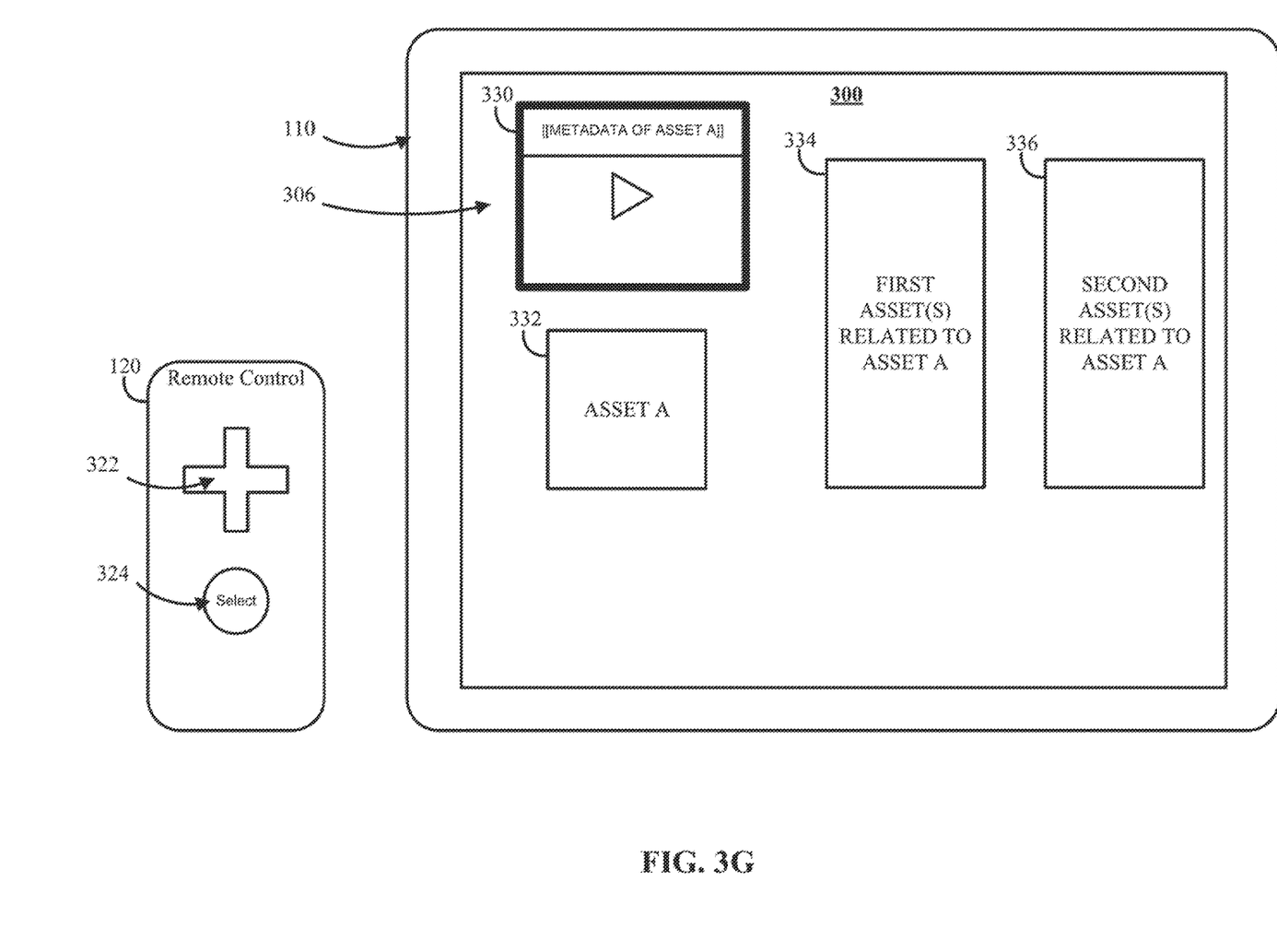

As shown in FIG. 3G, process 200 can cause media asset 330 (e.g., media asset A shown in FIG. 3F) to be presented at 210 in user interface 300 in response to selection of media asset A (or selection of the playlist corresponding to first related media identifier element 312) at 208. Process 200 can, in some embodiments, cause media identifiers related to media asset 330 (e.g., media identifier 334 and media identifier 336) to be presented in the second portion of user interface 300, and can cause a media identifier 332 corresponding to media asset A to be presented in the third portion of user interface 300.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the process of FIG. 2 can be executed or performed in any order or sequence not limited to the order and sequence shown and described in the figures. Also, some of the above steps of the process of FIG. 2 can be executed or performed substantially simultaneously where appropriate or in parallel to reduce latency and processing times. Furthermore, it should be noted that FIG. 2 is provided as an example only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for presenting related content in a user interface navigated using directional controls are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of media guidance, the method comprising:
causing, using a hardware processor of a media device, a user interface to be presented that includes a first plurality of media identifier elements arranged along a first direction;
in response to receiving a selection of a first media identifier element from the first plurality of media identifier elements in the user interface, causing a media content item corresponding to the first media identifier element to be played back and causing at least one related media element to be presented in the user interface, wherein the at least one related media element is aligned with the first media identifier element along the first direction and wherein the at least one related media element corresponds to a list including a plurality of media content items that are related to the media content item being played back; and
in response to detecting a placement of a navigation element within the user interface on the at least one related media element in the user interface, causing the at least one related media element to be modified to include indications of a second plurality of media identifier elements that are arranged along a second direction that is orthogonal to the first direction, wherein each of the second plurality of media identifier elements corresponds to the list and one of the plurality of media content items in the list, wherein selection of a first related media identifier element from the second plurality of media identifier elements corresponding to the list causes the plurality of media content items to be played back in an order, and wherein selection of a second related media identifier element from the second plurality of media identifier elements corresponding to one of the plurality of media content items causes that related media content item to be played back.

2. The method of claim 1, wherein the first direction is from a first position of the user interface to a second position of the user interface.

3. The method of claim 1, further comprising identifying the plurality of media content items included in the at least one related media element in response to the selection of the first media identifier element from the first plurality of media identifier elements in the user interface.

4. The method of claim 1, wherein a second related media element that is aligned with the at least one related media element along the first direction is presented in the user interface.

5. The method of claim 4, further comprising, in response to detecting the placement of the navigation element within the user interface on the second related media element in the user interface, causing the second related media element to transition to present a third plurality of media identifier elements arranged along the second direction that is orthogonal to the first direction.

6. The method of claim 4, wherein each of the at least one related media element and the second related media element is presented with metadata that represents media content items included in each of the media elements.

7. A system of media guidance, the system comprising:
a memory; and
a hardware processor that, when executing computer-executable instructions stored in the memory, is programmed to:
cause a user interface to be presented that includes a first plurality of media identifier elements arranged along a first direction;
in response to receiving a selection of a first media identifier element from the first plurality of media identifier elements in the user interface, cause a media content item corresponding to the first media identifier element to be played back and causing at least one related media element to be presented in the user interface, wherein the at least one related media element is aligned with the first media identifier element along the first direction and wherein the at least one related media element corresponds to a list including a plurality of media content items that are related to the media content item being played back; and
in response to detecting a placement of a navigation element within the user interface on the at least one related media element in the user interface, cause the at least one related media element to be modified to include indications of a second plurality of media identifier elements that are arranged along a second direction that is orthogonal to the first direction, wherein each of the second plurality of media identifier elements corresponds to the list and one of the plurality of media content items in the list, wherein selection of a first related media identifier element from the second plurality of media identifier elements corresponding to the list causes the plurality of media content items to be played back in an order, and wherein selection of a second related media identifier element from the second plurality of media identifier elements corresponding to one of the plurality of media content items causes that related media content item to be played back.

8. The system of claim 7, wherein the first direction is from a first position of the user interface to a second position of the user interface.

9. The system of claim 7, wherein the hardware processor is further programmed to identify the plurality of media content items included in the at least one related media element in response to the selection of the first media identifier element from the first plurality of media identifier elements in the user interface.

10. The system of claim 7, wherein a second related media element that is aligned with the at least one related media element along the first direction is presented in the user interface.

11. The system of claim 10, wherein the hardware processor is further programmed to, in response to detecting the placement of the navigation element within the user interface on the second related media element in the user interface, cause the second related media element to transition to present a third plurality of media identifier elements arranged along the second direction that is orthogonal to the first direction.

12. The system of claim 10, wherein each of the at least one related media element and the second related media element is presented with metadata that represents media content items included in each of the media elements.

13. A non-transitory computer-readable medium containing computer executable instructions that, when executed by a processor, cause the processor to perform a method of media guidance, the method comprising:
cause a user interface to be presented that includes a first plurality of media identifier elements arranged along a first direction;
in response to receiving a selection of a first media identifier element from the first plurality of media identifier elements in the user interface, causing a media content item corresponding to the first media identifier element to be played back and causing at least one related media element to be presented in the user interface, wherein the at least one related media element is aligned with the first media identifier element along the first direction and wherein the at least one related media element corresponds to a list including a plurality of media content items that are related to the media content item being played back; and
in response to detecting a placement of a navigation element within the user interface on the at least one related media element in the user interface, causing the at least one related media element to be modified to include indications of a second plurality of media identifier elements that are arranged along a second direction that is orthogonal to the first direction, wherein each of the second plurality of media identifier elements corresponds to the list and one of the plurality of media content items in the list, wherein selection of a first related media identifier element from the second plurality of media identifier elements corresponding to the list causes the plurality of media content items to be played back in an order, and wherein selection of a second related media identifier element from the second plurality of media identifier elements corresponding to one of the plurality of media content items causes that related media content item to be played back.

14. The non-transitory computer-readable medium of claim 13, wherein the first direction is from a first position of the user interface to a second position of the user interface.

15. The non-transitory computer-readable medium of claim 13, further comprising identifying the plurality of media content items included in the at least one related media element in response to the selection of the first media identifier element from the first plurality of media identifier elements in the user interface.

16. The non-transitory computer-readable medium of claim 13, wherein a second related media element that is aligned with the at least one related media element along the first direction is presented in the user interface.

17. The non-transitory computer-readable medium of claim 16, further comprising, in response to detecting the placement of the navigation element within the user interface on the second related media element in the user interface, causing the second related media element to transition to present a third plurality of media identifier elements arranged along the second direction that is orthogonal to the first direction.

18. The non-transitory computer-readable medium of claim 16, wherein each of the at least one related media element and the second related media element is presented with metadata that represents media content items included in each of the media elements.

* * * * *